United States Patent [19]
Cardona

[11] Patent Number: 6,039,522
[45] Date of Patent: Mar. 21, 2000

[54] AUTOMATIC LOCKING AND UNLOCKING SHORING BAR

[75] Inventor: Edgardo Cardona, Atchison, Kans.

[73] Assignee: Kinedyne Corporation, North Branch, N.J.

[21] Appl. No.: 09/232,612

[22] Filed: Jan. 19, 1999

[51] Int. Cl.[7] .................................. B60P 7/14; B60P 7/135
[52] U.S. Cl. ..................... 410/127; 405/282; 410/121
[58] Field of Search .................................. 405/282, 283, 405/272, 273; 410/121, 141–144, 151, 149, 32, 43, 150, 127; 211/41.15

[56] References Cited

U.S. PATENT DOCUMENTS

| | | | |
|---|---|---|---|
| 3,802,356 | 4/1974 | Hassellof et al. | 410/142 |
| 3,851,856 | 12/1974 | Berg | 405/282 X |
| 3,995,565 | 12/1976 | Kerseyt | 405/282 X |
| 5,472,301 | 12/1995 | Wallen | 410/151 |

FOREIGN PATENT DOCUMENTS 747133 11/1966 Canada ................................. 410/142

*Primary Examiner*—Dennis L. Taylor
*Attorney, Agent, or Firm*—Young & Basile, P.C.

[57] ABSTRACT

An extensible shoring bar for bracing vehicle loads wherein telescoping tubular elements are spring biased toward an extended position for wedging the bar between the sides of a van or truck. An actuator interposed between the tubular elements includes a rotatable locking detent which automatically rotates between locking and release positions upon full retraction of the elements permitting the shoring bar to be locked in a retracted position for handling and positioning purposes, and by fully retracting the elements, the detent is automatically released permitting the elements to be expanded under the influence of a compression spring. The automatic locking and unlocking action of the actuator occurs upon sequential retractions of the tubular elements.

7 Claims, 2 Drawing Sheets

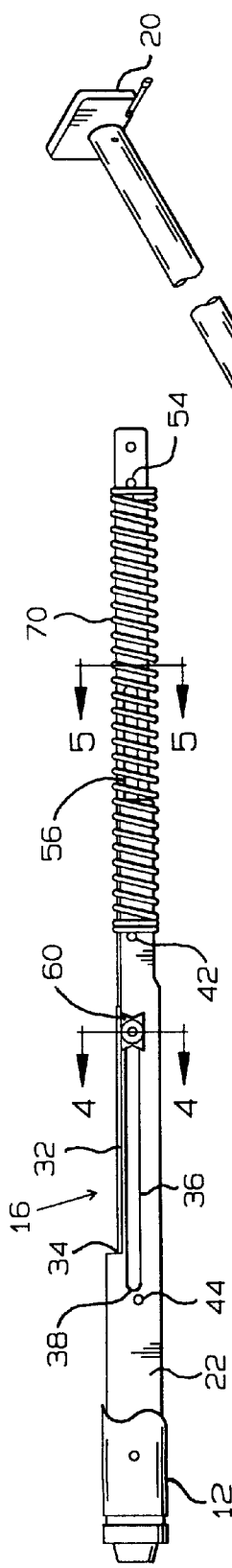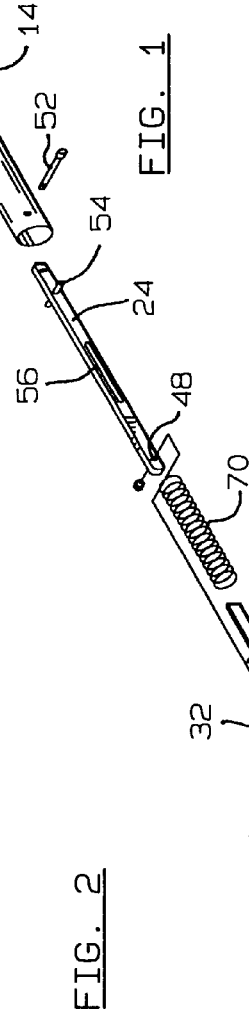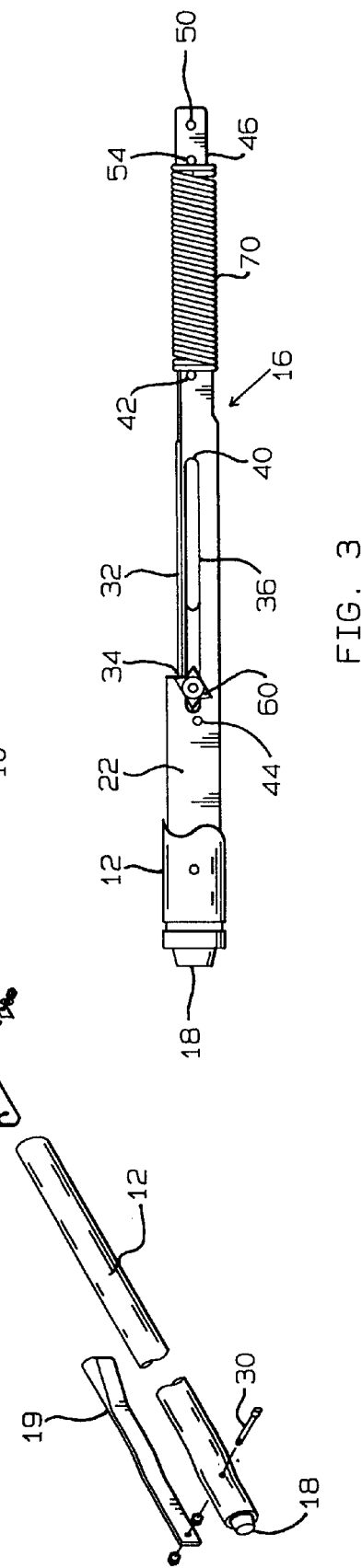

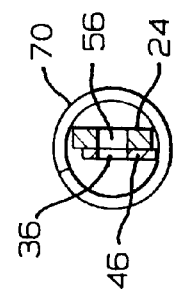
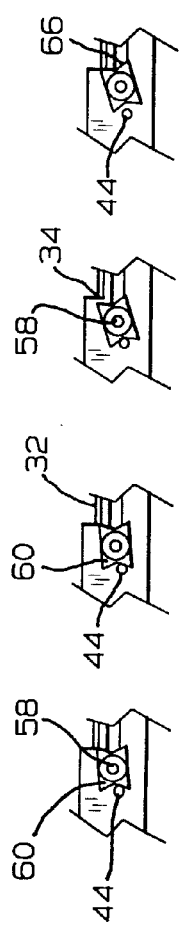
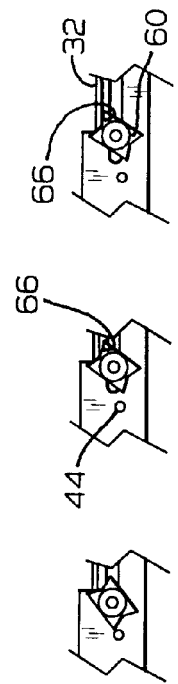
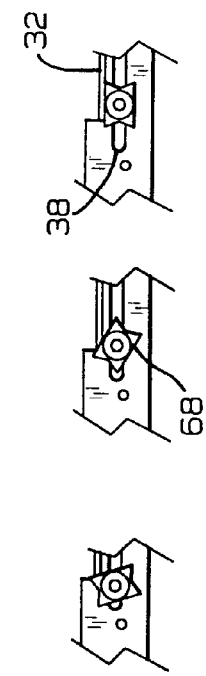

AUTOMATIC LOCKING AND UNLOCKING SHORING BAR

BACKGROUND OF THE INVENTION

1. Field of the Invention

The invention pertains to dunnage control shoring bars using tubular telescoping elements adapted to retract and extend to vary the shoring bar length.

2. Description of the Related Art

Spring biased extendible and retractable telescoping element shoring bars are known. Such shoring bars include fittings at the ends for engaging the opposing surfaces of a trailer or van whereby the bar may be wedged in place to prevent freight movement. Necessarily, the compression spring extending the bar elements must produce a relatively high force in order to achieve the desired frictional engagement with the van sides.

The necessity to manually compress the shore bar spring to retract its length for positioning purposes renders the handling and positioning of a shore bar difficult, often requiring significant exertion by the installer. While various manual locking devices have been proposed to lock the shoring bar in a retracted position during handling of the bar, an automatic locking of a shoring bar has not been achieved whereby the operator need only grasp the bar elements, or handles mounted on the elements, and separate actuation of a locking mechanism is not required.

OBJECTS OF THE INVENTION

It is an object of the invention to provide a dunnage shoring bar utilizing spring biased tubular elements wherein the bar elements may be automatically locked in a retracted condition upon full retraction and released by subsequent full retraction, and wherein it is not necessary for the operator to manually operate separate locking and unlocking mechanism.

Another object of the invention is to provide a dunnage shoring bar utilizing spring biased telescoping elements wherein a locking detent incorporated within the confines of the shoring bar automatically locks the elements in a retracted position upon the elements being fully retracted, and wherein the locking detent is released by subsequent full retraction of the elements permitting the elements to expand to their operative length.

Yet another object of the invention is to provide a dunnage shoring bar utilizing spring biased telescoping elements wherein the elements are automatically locked in a retracted condition by an actuator, and the actuator is automatically released by subsequent element full retraction to permit a spring to extend the elements, and wherein the actuator is entirely enclosed within the tubular elements and is not subject to damage.

SUMMARY OF THE INVENTION

A dunnage shoring bar in accord with the invention utilizes a pair of elongated tubular elements, one element being telescopingly received within the other. At each outer end of the elements, a mounting or friction fitting is located for cooperation with the walls, ceilings, or floor of the space containing freight in which the shoring bar is located.

An actuator is located within the tubular elements having relatively movable components, each component being attached to one of the elements. The actuator components longitudinally slide relative to each other and are biased away from each other in a longitudinal direction by a compression spring surrounding the actuator elements.

One of the actuator elements includes a rotatable locking detent adapted to cooperate with a shoulder defined on the other actuator element wherein the detent and shoulder engage under certain conditions to maintain the actuator elements in a retracted condition maintaining the shore bar tubes in the retracted condition to permit handling and positioning prior to use.

The locking detent is rotatably mounted upon a pivot supported by one of the actuator elements, and an abutment defined on the other actuator element engages the detent when the elements are longitudinally displaced to their maximum retracted condition. The engagement of the detent and the abutment upon full retraction of the elements pivots the detent in a direction misaligning the detent with the shoulder thereupon permitting the actuator elements to expand under the influence of the compression spring.

The locking detent includes a shaped surface which cooperates with the shoulder of the other detent such that rotation of the detent due to the forces imposed thereon by the spring will not disengage the shoulder and detent. However, upon full retraction of the elements, engagement of the detent and abutment will permit pivoting of the detent in that the detent surface and shoulder are disengaged.

Once the shoring bar tubes, and actuator elements, are extended, retraction of the tubes and elements causes the locking detent to engage the abutment pivoting the detent into alignment with the shoulder wherein slight movement of the actuator elements in the extended direction causes the detent to engage the shoulder and restrain the actuator from further expansion.

Accordingly, it will be appreciated that the shoring bar will be automatically locked in its retracted position during alternate retraction cycles. Full compression of the shoring bar spring and movement of the actuator elements pivots the locking detent for engagement with the locking shoulder and the subsequent retraction of the shoring bar elements misaligns the locking detent with the shoulder permitting maximum extension of the shoring bar. As only axial forces need to be applied to the shoring bar tubes, it is not necessary for the operator to release his grip upon the shoring bar tubes during handling and positioning, and the invention significantly reduces the exertion required by the operator as compared with previous shoring bar constructions. The shoring bar construction and appearance is clean and free of protuberances likely to be damaged, and as the actuator components are all encompassed within the shoring bar tubes, the actuator components are protected against damage and dirt.

BRIEF DESCRIPTION OF THE DRAWINGS

The aforementioned objects and advantages of the invention will be appreciated from the following description and accompanying drawings wherein:

FIG. 1 is a perspective exploded view of a dunnage shoring bar in accord with the invention, FIG. 2 is an elevational view of the shoring bar actuator illustrating the components in the extended position, FIG. 3 is an elevational view of the actuator illustrating the components in the retracted locked condition, FIG. 4 is a sectional view as taken through the locking detent pivot along Section 4—4 of FIG. 2, FIG. 5 is an elevational sectional view taken along Section 5—5 of FIG. 2, FIGS. 6–12 are elevational detail sequential views of the locking detent illustrating the operation and positioning of the locking detent to the lock position, and FIGS. 13–19 are elevational detail views of the locking detent positioning the locking detent from the locking position to the release position permitting extension of the actuator elements and shoring bar tubes.

DESCRIPTION OF THE PREFERRED EMBODIMENT

With reference to FIG. 1, a dunnage shoring bar in accord with the invention is generally represented at 10, and the shoring bar includes an elongated tube 12 having a tube 14 telescopingly received therein. A spring biased actuator assembly 16 is internally interposed between the tubes 12 and 14 and biases the tubes in a longitudinal direction away from each other toward an extended position during use.

An end fitting 18 is mounted upon the tube 12 and includes a projection for reception within a depression defined in the vehicle wall, floor or ceiling, and a strap 19 may be affixed to the end of the tube 12 to facilitate handling as later described. The outer end of the right tube 14 includes an end fitting 20 in the form of a pad for frictionally engaging the van or truck side, wall or ceiling and the fitting 20 may include rubber legs or feet to increase friction. Handles or loops may be attached to the tube 14 to facilitate manual retraction of the tubes relative to each other, but the use of such handles or loops is optional.

The actuator 16 includes an element 22 which is attached to the tube 12 and an element 24 attached to the tube 14. The elements 22 and 24 are economically manufactured of flat stamped metal components.

The left end 26 of the element 22 includes a hole 28 for receiving the pin 30 which extends through a hole in the tube 12 and the pin 30 simultaneously affixes the actuator element 22 to the tube 12 while attaching the strap 19 thereto. The element 22 also includes a flange 32 bent at a right angle to the general plane of the element 22, and the end of the flange 32, and the underside of the flange adjacent the end define a shoulder 34 which cooperates with the locking detent as later described.

An elongated slot 36 is defined in element 22 having ends 38 and 40, and a spring anchor pin 42 extends through the element 22. An abutment pin 44 is mounted on the element 22 adjacent the slot end 38. The inner end of the element 22 is of a smaller dimension than the element end 26 for reception within the compression spring as later described.

The actuator element 24 is also of a flat sheet metal construction and includes a hole 48 for receiving the locking detent pivot pin as later described. The actuator element 24 also includes a hole 50 which cooperates with a pin 52 whereby the element 24 may be attached to the tube 14. A spring anchor pin 54 extends through the element 24, and an elongated slot 56 defined in element 24 provides clearance for the spring anchor pin 42 of element 22 which is located within the slot.

A pivot pin 58, FIG. 4, is mounted within the hole 48 of the element 24 and the pin 58 includes shoulders whereby the locking detent 60 is freely rotatable on the pivot pin 58. A spring washer 62 bears against the detent 60 to frictionally resist rotation of the detent on its pin 58, and a nut 64 may be adjusted to control the tension on the spring washer 62.

The locking detent 60 is of a flat "butterfly" configuration having V-shaped surfaces 66 at opposite ends whereby the detent surfaces 66 engage with the underside of the flange 32, and the end of the flange 32 will engage the associated detent surface 66 at the apex as shown in FIG. 12 during retention of the shoring bar elements in the retracted position. The opposite sides 68 of the locking detent are parallel to each other and are selectively engaged by the abutment pin 44 as later described.

An elongated compression spring 70 surrounds the end 46 of the element 22, and also surrounds the element 24, as apparent in FIG. 5. In this manner, the spring 70 serves to maintain the actuator elements 22 and 24 in a parallel sliding relationship, and the abutment of the ends of the spring 70 with the anchor pin 42 affixed to element 22 and the anchor pin 52 mounted on element 24 tends to bias the tubes 12 and 14 in a longitudinal direction away from each other.

It is appreciated from the above description that the actuator assembly 16 is located within the shoring bar tubes 12 and 14, and the element 22 is fixed to the tube 12 while the element 24 is fixed to the tube 14. When the components are in the relationship shown in FIG. 2, the compression spring 70 is biasing the elements 22 and 24 in a longitudinal direction away from each other which biases the tubes 12 and 14 away from each other toward the extended condition of the shoring bar 10. In this manner, the spring 70 is capable of forcing the fittings 18 and 20 tightly against the sides, or floor and ceiling, of a cargo carrying van or trailer, and as the bar 10 will be placed against the load, lateral movement of the load will be prevented by the presence of the bar. A plurality of shoring bars 10 may be used in a single van, and such use of shoring bars is well known in the trade.

When it is desired to retract the shoring bar to permit it to be removed from the van, or repositioned, it is only necessary for the operator to move the tubes 12 and 14 toward each other. Such action is facilitated by the strap 19, and by the operator simultaneously gripping the tube 14. Movement of the tubes 12 and 14 toward each other compresses the spring 70 moving the locking detent 60 under the flange 32 toward the slot end 38. Upon the tube 14 being moved the maximum extent over the tube 12, the abutment pin 44 will engage a V notch edge surface 66 of the detent 60 as shown in FIG. 6. Because the abutment pin 44 is misaligned with the axis of the detent pivot pin 58, the engagement of the abutment pin with the detent surface, and the configuration of the detent surface, will produce a counterclockwise rotation of the detent 60 as shown in FIG. 6. Such counterclockwise movement of the detent is possible because the detent has now moved out from under the flange 32 and shoulder 34 of element 22. Thereupon, movement of the tubes 12 and 14 in an extended direction causes the shoulder 34 of flange 32 to engage the other notched surface 66 of the detent, FIG. 9, as the detent has been rotated in the counterclockwise direction as shown in FIGS. 7 and 8 wherein the V surface is now in alignment with the shoulder 34. Slight further movement of the tubes 12 and 14 away from each other causes further counterclockwise rotation of the detent, FIGS. 10 and 11, and, ultimately, the V surfaces of the detent will be relating to the shoulder 34 of flange 32 in the manner shown in FIG. 12 wherein one of the V notch surfaces 66 is parallel to and engaging the underside of the flange 32, while the end of the flange 32 will be engaging the apex of the associated V surfaces. It is to be appreciated that in this description, the "shoulder 34" includes both the terminal end of the flange 32 and the underside surface of the flange 32.

Further counterclockwise rotation of the detent 60 from the relationship shown in FIG. 12 is prevented by the engagement of the V notch surface 66 with the underside of the flange 32, and the tubes 12 and 14 will be held in the retracted relationship reducing the length of the shoring bar 10 and permitting the shoring bar to be removed or repositioned as desired.

When extension of the shoring bar is to take place, the operator again moves the tubes 12 and 14 toward each other toward full retraction wherein the detent 60 approaches the abutment pin 44 as shown in FIG. 13. Upon the abutment pin 44 engaging the nearest detent side 68, FIG. 14, the detent 60 will have cleared the flange shoulder 34, FIG. 14, and engagement of the abutment pin 44 with the detent side 68 produces further counterclockwise direction of the detent as shown in FIG. 16. Thereupon, continued movement of the tubes 12 and 14 toward each other causes the flange shoulder 34 to engage the other side 68 of the detent 60, FIG. 16 further pivoting the detent 60 in a counterclockwise direction as shown in FIG. 18. This counterclockwise detent rotation continues to occur until the detent 60 is "parallel" to the length of the flange 32, FIG. 19, and the detent will slide under flange 32, which permits the actuator elements 22 and 24 to be longitudinally biased away from each other by the spring 70 permitting the tubes 12 and 14 to expand to an extended operative position. Such extension of the tubes 12 and 14 is limited by engagement of the detent pivot pin 58 with the slot end 40.

When it is desired to again retract the length of the shoring bar 10, tubes 12 and 14 are retracted toward each other and the sequence of FIGS. 6–12 is repeated. Accordingly, it will be appreciated that alternate retractions of the tubes 12 and 14 produce locking conditions, while alternate retractions of the tubes produce unlocking conditions permitting shoring bar extension.

In the practice of the invention, the operation of the locking detent 60 is fully automatic, and the operator only needs to axially displace the tubes 12 and 14 relative to each other to produce the desired extended or retracted condition of the shoring bar. The actuator 16 is fully enclosed within the tubes 12 and 14 and is protected from damage and contamination by foreign matter, and a clean smooth exterior surface is provided.

It is appreciated that various modifications to the inventive concepts may be apparent to those skilled in the art without departing from the spirit and scope of the invention.

I claim:

1. A shoring bar comprising elongated first and second telescopingly interconnected tubes, a spring biased actuator interposed between said tubes selectively biasing said tubes longitudinally to increase the shoring bar length, said actuator including elongated first and second elements connected to said first and second tubes, respectively, spring means interposed between said elements longitudinally biasing said elements away from each other, a locking detent mounted upon one of said elements selectively movable between locking and release positions cooperating with a shoulder defined on the other element whereby engagement of said detent and said shoulder occurs in said locking position and retains said elements in a retracted position and disengagement of said detent and said shoulder occurs in said release position and permits said elements to be biased to an extended position, stops defined on said elements limiting relative movement of said elements in said extended position, and a detent shifter fixed with respect to said other element moving said detent between said locking and release positions upon relative axial movement of said elements in a retracting direction.

2. In a shoring bar as in claim 1, said detent shifter moving said locking detent from said release position to said locking position upon said elements being translated to their maximum retracted position and moving said shifter from said locking position to said release position at the next translation of said elements to their maximum retracted position.

3. In a shoring bar as in claim 2, said locking detent being pivotally mounted on said one element for selective rotation between said locking and release positions.

4. In a shoring bar as in claim 3, said shifter comprising an abutment mounted on said other element engaging said detent at the fully retracted position of said elements.

5. In a shoring bar as in claim 4, said locking detent including a shoulder engaging surface engaging said shoulder at said locking position, said shoulder engaging surface preventing rotation of said detent when said elements are in the retracted position.

6. In a shoring bar as in claim 1, said elements being formed of sheet metal.

7. In a shoring bar as in claim 3, a longitudinally extending slot having ends defined in said other element, a pivot mounted on said one element extending through said slot, said locking detent being pivotally mounted on said pivot, said slot ends defining said stops limiting relative movement of said elements.

\* \* \* \* \*